United States Patent Office 3,356,747
Patented Dec. 5, 1967

3,356,747
PREPARATION OF 2,2,2-TRIFLUOROETHANOL BY CATALYTIC HYDROGENATION
Louis G. Anello, Basking Ridge, and William J. Cunningham, Rockaway, N.J., assignors to Allied Chemical Corporation, New York, N.Y., a corporation of New York
No Drawing. Filed Sept. 30, 1964, Ser. No. 400,563
13 Claims. (Cl. 260—633)

This invention relates to the preparation of 2,2,2-trifluoroethanol by the catalytic hydrogenation of 2,2,2-trifluoroethyl trifluoroacetate.

Trifluoroethanol is a known compound and can be prepared by a process involving a high pressure, high temperature reaction of trifluoroethyl chloride with potassium acetate followed by saponification of the resulting acetate ester. This and other suggested prior procedures are relatively complicated and not satisfactory for economical commercial use. It is an object of the present invention to provide a process for making trifluoroethanol from 2,2,2-trifluoroethyl trifluoroacetate by an easily controllable, catalytic gas phase reaction carried out at ordinary pressure and at relatively low temperature.

Thus in accordance with this invention, hydrogen is reacted with 2,2,2-trifluoroethyl trifluoroacetate in vapor phase at a temperature within the range of about 200° to 400° C. in the presence of a chromium oxide based acid to alcohol reduction catalyst consisting essentially of chromium oxide and a hydrogenating metal oxide.

The reaction proceeds according to the equation

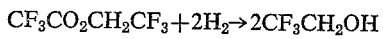

$$CF_3CO_2CH_2CF_3 + 2H_2 \rightarrow 2CF_3CH_2OH$$

with conversions ranging up to 75% and yield based on 2,2,2-trifluoroethyl trifluoroacetate consumed ranging up to about 92%.

The reaction conditions include a temperature within the range of about 200° to 400° C., preferably within the range of about 225° to 325° C., a pressure of atmospheric to 5 atmospheres, a hydrogen to 2,2,2-trifluoroethyl trifluoroacetate ratio of about 2 to 50:1 respectively, and a space velocity of within the range of about 100 to 1000, preferably within the range of about 200 to 500, the space velocity being the volumes of reactant gas measured at room temperature per volume of catalyst in the reactor per hour. At temperatures lower than about 200° C., little or no reaction is obtained, whereas at temperatures above about 400° C., there is marked fragmentation of organic material with the formation of undesired by-products such as $CHF_3$, $CO_2$, $HF$ and carbon. It is preferable to adjust hydrogen and 2,2,2-trifluoroethyl trifluoroacetate reactant flows, temperature, and space velocity so that hydrogen is completely reacted in order to avoid expensive separation processes.

Exiting from the reaction zone are $CF_3CH_2OH$ (boiling point 74.5° C.) together with unreacted $CF_3CO_2CH_2CF_3$ (boiling point 55° C.) and some hydrogen. Gaseous products of the reaction can be isolated by suitable cooling, such as in a Dry Ice acetone trap. By this procedure, unreacted hydrogen passes through the tap while

$$CF_3CH_2OH$$

and unreacted $CF_3CO_2CH_2CF_3$ are obtained as condensate in the trap. The $CF_3CH_2OH$ product can be recovered from the condensate by fractional distillation.

The catalysts useful in the process of this invention are the conventional chromium oxide based catalysts useful in reducing an acid or an ester to an alcohol. They can be the conventional copper chromite catalyst such as those described in "Reactions of Hydrogen With Organic Compounds Over Copper-Chromium Oxide and Nickel Catalysts," H. Adkins, Univ. Wisconsin Press (1937). These conventional catalysts consist essentially of chromium oxide and a hydrogenating metal oxide such as copper, zinc, nickel, iron, cadmium, magnesium, manganese and silver and often contain promoting or stabilizing amounts of other metal oxides such as barium oxide, calcium oxide, magnesium oxide, cadmium oxide, lead oxide, silver oxide, and the like. Generally, the weight ratio of chromium oxide to hydrogenating metal oxide is 0.5 to 10:1, preferably 0.5 to 2:1, and the weight ratio of hydrogenating metal oxide to stabilizing metal oxide is 0.5 to 6:1, preferably 2 to 4:1. The preferred catalyst is composed of chromium oxide, copper oxide, and barium oxide in a weight ratio of 3:3:1 respectively.

Various combinations containing oxides of chromium and other metals may be prepared by a number of different procedures, for example: (1) by decomposition of copper-barium ammonium chromates, carbonates or nitrates; (2) by coprecipitating the hydroxides of barium, copper and chromium by addition of a solution of potassium hydroxide to a solution of their nitrates; (3) by the grinding or heating together of the oxides of copper, barium and chromium, etc.

The catalyst may be dispersed or distributed on a carrier material which is inert or active as a hydrogenating agent. Carrier materials useful for this purpose include fuller's earth, silica, alumina, magnesia mixtures of any two or all three of silica, alumina and magnesia, cement, and the like. When using the carrier material it comprises about 0.1 to 10 times, preferably 0.1 to 1 times the weight of the principal catalytic components, i.e. the chromium and hydrogenating metal oxides.

The catalyst may not require any elaborate pretreatment prior to use in the reaction zone. In some cases, however, it may be desirable to charge the catalyst to the reaction zone for treatment under reaction conditions for the purpose of activation or conversion of the catalyst to an active form. The catalyst thus can be subjected to a preliminary treatment by contact with a hydrogen containing gas or suitable reducineg agent prior to use under reaction conditions. The preliminary treatment generally involves contacting the catalyst with hydrogen at a temperature of 100 to 800° C. for a period of 0.5 to 10 hours.

The following examples illustrate in detail the method of this invention.

*Example I*

The catalyst used in this example was prepared in the following manner. There were dissolved in about 1400 grams of water, 27 grams of $Cu(NO_3)_2 \cdot 3H_2O$, 73 grams of $Cr(NO_3)_3 \cdot 9H_2O$, 124 grams of $Zn(NO_3)_2 \cdot 6H_2O$ and 136 grams of $Ca(NO_3)_2 \cdot 4H_2O$. To this solution was added a solution of 134 grams of potassium fluoride and 90 grams of potassium hydroxide in about 800 grams of water. About 100 cubic centimeters of the dried material were charged into a ⅝ inch internal diameter tubular reactor externally heated over 30 inches of length by an electric furnace provided with automatic temperature control. The material was thoroughly dried by heating at temperatures up to 300° C. in a current of nitrogen then reduced by continued heating for 3 hours, first at about 150° C. with a stream of hydrogen diluted with nitrogen, followed by heating at about 350° C. in a stream of hydrogen.

Internal temperature of the reactor was lowered to 225° C. and a mixture consisting of about 129 grams (0.66 mole) of $CF_3CO_2CH_2CF_3$ and about 1.91 moles (46 liters) of hydrogen were passed into and through the reactor at a volume hourly space velocity of 480 and a 7.5 second retention time during a period of 2.25 hours. Exit products from the reactor were passed into and through a trap cooled by Dry Ice-acetone wherein organic material was condensed. Fractional distillation of the cold trap condensate effected recovery of 0.286 mole of $$CF_3CO_2CH_2CF_3$$

(B.P. 55° C.) and 0.677 mole $CF_3CH_2OH$ (B.P. 74.5° C.). Thus, of the organic material feed, 51% was converted to the alcohol. Yield based on organic material consumed was 88%.

*Example II*

A zinc chromite catalyst was prepared by cold precipitation as a result of mixing solutions containing molecular equivalents of zinc nitrate and ammonium chromate. The precipitate was filtered, washed and substantially dried at 125° C. When heated slightly higher, this basic salt decomposed spontaneously with evolution of heat to leave a glowing residue of combined zinc oxide and chromium sesquioxide. About 100 cubic centimeters of pelleted catalyst were charged to the reactor and pretreated as described in Example I. Reactor temperature was reduced to 325° C. and a mixture of 84 grams (0.43 mole) of $CF_3CO_2CH_2CF_3$ and 1.2 moles of hydrogen were passed into and through the reactor during a period of 1.5 hours at a volume hourly space velocity of 480 and a 7.5 second retention time. Exit products were condensed and recovered as described in Example I. Fractional distillation of the cold trap condensate, 64 grams, effected recovery of 43 grams (0.23 mole) of $CF_3CO_2CH_2CF_3$ and 15 grams (0.165 mole) of $CF_3CH_2OH$. Conversion to the alcohol was 19%.

*Example III*

A barium promoted copper chromite catalyst was prepared by adding 900 milliliters of a solution containing 260 grams of $Cu(NO_3)_2 \cdot 3H_2O$ and 31 grams of $Ba(NO_3)_2$ to 900 milliliters of a solution containing 151 grams of $(NH_4)_2Cr_2O_7$ and 225 milliliters of 28% $NH_4OH$. The precipitate was filtered, washed, dried at 125° C. for 12 hours and pulverized. The precipitate was decomposed carefully over a free flame. The powder changed from orange to black. The catalyst was pelleted before use. About 100 milliliters of catalyst were placed in the reactor and pretreated as described in Example I.

Internal temperature of the reactor was lowered to 265° C. and a mixture of 747 grams (3.81 moles)

$$CF_3CO_2CH_2CF_3$$

and 7.62 moles of hydrogen were passed into and through the reactor at a volume hourly space velocity of 240 and a 15 second retention time for a period of 27 hours. Exit products were condensed and recovered as described in Example I. Fractional distillation of the cold trap condensate effected recovery of 186 grams (0.95 mole) of $CF_3CO_2CH_2CF_3$ and 521 grams (5.21 moles) of $$CF_3CH_2OH$$

Thus, of the organic material feed, 75% was converted to the alcohol. Yield on organic material consumed was 91.5%.

2,2,2-trifluoroethanol is useful for a variety of purposes. For example, it is useful as a starting material for the production of trifluoroethyl vinyl ether, $$CF_3CH_2OCH=CH_2$$

an anesthetic. Trifluoroethanol can also be used as a re-refrigerant or copolymerized with, for example, methacrylic acid chloride, to give polymers with low refractive indexes and high relative dispersions.

The embodiments of the invention in which an exclusive property or privilege is claimed are defined as follows:

1. A method for the preparation of 2,2,2-trifluoroethanol which comprises passing a vaporous mixture of hydrogen and 2,2,2-trifluoroethyl trifluoroacetate at a temperature within the range of about 200° to 400° C. and at a pressure of one to five atmospheres through a reactor containing a chromium oxide based acid-to-alcohol reduction catalyst, and separating 2,2,2-trifluoroethanol from the resultant reaction mixture.

2. The method of claim 1 wherein the catalyst consists essentially of chromium oxide and a hydrogenating metal oxide selected from the class consisting of copper oxide, zinc oxide, nickel oxide, iron oxide, cadmium oxide, magnesium oxide, manganese oxide and silver oxide.

3. The method of claim 1 wherein the catalyst consists essentially of chromium oxide, a hydrogenating metal oxide selected from the class consisting of copper oxide, zinc, oxide, nickel oxide, iron oxide, cadmium oxide, magnesium oxide, manganese oxide and silver oxide, and a stabilizing metal oxide selected from the class consisting of barium oxide, calcium oxide, magnesium oxide, lead oxide and silver oxide.

4. The method of claim 1 wherein the catalyst consists essentially of chromium oxide, copper oxide and barium oxide.

5. The method of claim 1 wherein the catalyst consists essentially of chromium oxide and zinc oxide.

6. The method of claim 1 wherein the catalyst consists essentially of chromium oxide, copper oxide, zinc oxide and calcium oxide.

7. The method of claim 2 wherein the weight ratio of chromium oxide to hydrogenating metal oxide is 0.5 to 10:1.

8. The method of claim 2 wherein the weight ratio of chromium oxide to hydrogenating metal oxide is 0.5 to 2:1.

9. The method of claim 3 wherein the weight ratio of chromium oxide to hydrogenating metal oxide is 0.5 to 10:1 and the weight ratio of hydrogenating metal oxide to stabilizing metal oxide is 0.5 to 6:1.

10. The method of claim 3 wherein the weight ratio of chromium oxide to hydrogenating metal oxide is 0.5 to 2:1 and the weight ratio of hydrogenating metal oxide to stabilizing metal oxide is 2 to 4:1.

11. The method of claim 4 wherein the weight ratio of chromium oxide to copper oxide to barium oxide is substantially within the range of about 3:3:1.

12. A method for the preparation of 2,2,2-trifluoroethanol which comprises passing a vaporous mixture of hydrogen and 2,2,2-trifluoroethyl trifluoroacetate wherein the hydrogen to 2,2,2-trifluoroethyl trifluoroacetate mole ratio is 2 to 50:1, at a temperature within the range of about 200° to 400° C., at a pressure of one to five atmospheres and at a volume hourly space velocity in the range of about 100 to 1000 through a reactor containing a catalyst consisting essentially of chromium oxide, copper oxide and barium oxide, and separating 2,2,2-trifluoroethanol from the resultant reaction mixture.

13. A method for the preparation of 2,2,2-trifluoroethanol which comprises passing a vaporous mixture of hydrogen and 2,2,2-trifluoroethyl trifluoroacetate, wherein the hydrogen to 2,2,2-trifluoroethyl trifluoroacetate mole ratio is 2 to 50:1, at a temperature within the range of about 225° to 325° C., at a pressure of about one atmosphere and at a volume hourly space velocity within the range of about 200 to 500 through a reactor containing a catalyst consisting essentially of chromium oxide, copper oxide and barium oxide, wherein the weight ratio of chromium oxide to copper oxide to barium oxide is substantially within the range of about 3:3:1, and separating 2,2,2-trifluoroethanol from the resultant reaction mixture.

References Cited

UNITED STATES PATENTS

| | | | |
|---|---|---|---|
| 2,091,800 | 8/1937 | Adkins et al. | 260—633 |
| 2,666,797 | 1/1954 | Husted et al. | 260—633 |
| 3,314,987 | 4/1967 | Case et al. | 260—633 X |

LEON ZITVER, *Primary Examiner.*

N. J. KING, H. MARS, *Assistant Examiners.*